(12) United States Patent
Lu et al.

(10) Patent No.: US 12,466,534 B2
(45) Date of Patent: Nov. 11, 2025

(54) MOBILE UNDERWATER POWER GENERATION SYSTEM FOR OCEAN-GOING VESSEL

(71) Applicant: Yao Lu, Beijing (CN)

(72) Inventors: Jirong Lu, Beijing (CN); Yao Lu, Beijing (CN)

(73) Assignee: Yao Lu, Beijing (CN)

( * ) Notice: Subject to any disclaimer, the term of this patent is extended or adjusted under 35 U.S.C. 154(b) by 29 days.

(21) Appl. No.: 18/601,605

(22) Filed: Mar. 11, 2024

(65) Prior Publication Data

US 2024/0253759 A1    Aug. 1, 2024

Related U.S. Application Data

(63) Continuation of application No. PCT/CN2021/000231, filed on Dec. 1, 2021.

(30) Foreign Application Priority Data

Nov. 30, 2021  (CN) .......................... 202111437526.2
Nov. 30, 2021  (CN) .......................... 202122961526.4

(51) Int. Cl.
*B63J 3/04*    (2006.01)
*F03B 13/06*   (2006.01)

(52) U.S. Cl.
CPC ................. *B63J 3/04* (2013.01); *F03B 13/06* (2013.01); *B63J 2003/046* (2013.01)

(58) Field of Classification Search
CPC ........ B63J 3/04; B63J 2003/046; F03B 13/06; F03B 13/10; F03B 13/264; F03B 17/061; Y02E 10/30; F04D 3/00; F04D 13/04; H02J 15/00
See application file for complete search history.

(56) References Cited

U.S. PATENT DOCUMENTS

| 10,577,067 | B1 * | 3/2020 | Ouchi .................. G05D 1/0206 |
| 11,643,168 | B1 * | 5/2023 | Cataluna ................ B63B 1/042 |
| | | | 114/61.32 |

(Continued)

FOREIGN PATENT DOCUMENTS

| CN | 101656423 A | 2/2010 |
| CN | 101922402 A | 12/2010 |

(Continued)

*Primary Examiner* — Hoang M Nguyen

(57) ABSTRACT

A mobile underwater power generation system for an ocean-going vessel utilizing gravitational potential energy, including a hull of the ocean-going vessel, a cabin water tank, an open annular pipe structure, a ducted dual-magnetic circuit coreless tidal generator, a ducted water transfer pump, a fuel generator set, a control cabinet, a first electric motor, a second electric motor, a first propeller and a second propeller. The ducted water transfer pump includes a main shaft, a first fixing ring, an annular housing, a first bearing component, an annular stator winding structure, a rotor permanent magnet, a second bearing component, a second fixing ring, first fixing components, a flange bolt, a first rotor graphite bearing, an annular mounting sleeve, a water guide blade, a lead wire of the annular stator winding structure, a second rotor graphite bearing and second fixing components.

4 Claims, 6 Drawing Sheets

(56) References Cited

U.S. PATENT DOCUMENTS

| | | | | |
|---|---|---|---|---|
| 2006/0105647 A1* | 5/2006 | Yazaki | ............... | B63H 21/213 |
| | | | | 440/53 |
| 2018/0141622 A1* | 5/2018 | Zhou | ...................... | B63B 35/44 |
| 2019/0367387 A1* | 12/2019 | Gwon | ...................... | C25B 1/04 |
| 2021/0354791 A1* | 11/2021 | Sheldon-Coulson | ..... | F03D 9/19 |

FOREIGN PATENT DOCUMENTS

| | | |
|---|---|---|
| CN | 104963589 A | 10/2015 |
| CN | 207212586 U | 4/2018 |
| CN | 210317875 U | 4/2020 |
| CN | 112119213 A | 12/2020 |
| CN | 212695880 U | 3/2021 |
| KR | 101940260 B1 | 1/2019 |

* cited by examiner

MOBILE UNDERWATER POWER GENERATION SYSTEM FOR OCEAN-GOING VESSEL

CROSS-REFERENCE TO RELATED APPLICATIONS

This application is a continuation of International Patent Application No. PCT/CN2021/000231, filed on Dec. 1, 2021, which claims the benefit of priority from Chinese patent applications Ser. No. 202111437526.2 and No. 202122961526.4, both filed on Nov. 30, 2021. The content of the aforementioned application, including any intervening amendments made thereto, is incorporated herein by reference in its entirety.

TECHNICAL FIELD

This application relates to hydropower generation, more particularly to a mobile underwater power generation system for an ocean-going vessel.

BACKGROUND

Zheng He's voyages to the West used the wind energy on the earth to sail on the sea, and seven voyages to the West were completed without using a drop of oil. At present, in ocean transportation, fossil energy oil is used to drive vessels. Whether clean electric energy can be used as the energy to drive ocean-going vessels to change the energy structure in a field of maritime transportation has become a problem. In fact, electric energy cannot be stored like petroleum energy. The best way to utilize energy is that power generation devices and electrical devices must be operated at the same time. Ocean navigation has long distances and long sailing times, and no charging facilities are provided. It is impossible for ocean-going vessels to carry a large number of batteries as a driving energy source, and it is only possible to continue to consume heavy fuel oil or diesel oil as a driving energy source for ocean-going vessels. However, in addition to providing free wind energy, the earth also breeds inexhaustible clean energy in the ocean. However, ocean-going vessels are still stagnant in terms of energy utilization. The reasons are, first of all, the lack of awareness of utilizing the natural energy of ocean water bodies. Secondly, among the existing hydropower technology devices, such as turbines, generators, pumps and other hydraulic mechanical devices, no systematic power generation technology suitable for underwater power generation has yet been developed.

SUMMARY

Seawater is a liquid flowing substance and has the ability to maintain and restore its level. Hydraulic potential energy will not be generated by relatively stationary seawater, while an energy field of gravitational potential energy will be formed due to a tidal phenomenon of a sea. The tidal phenomenon refers to a periodic movement of sea water under a gravitational influence of the moon and the sun. A gravitational pull of the sun and the moon demonstrates an energy field of celestial bodies in the universe. It has been proven that a field is an objective form of material existence, possessing energy, mass and momentum. Since the tidal phenomenon contains an energy field of gravitational potential energy of cosmic celestial bodies, it is possible to create an energy field of gravitational potential energy of the tidal phenomenon and a power generation system utilizing gravitational potential energy, which can completely change the energy consumption structure of ocean-going vessels.

In order to achieve the above objectives, this application provides a mobile underwater power generation system for an ocean-going vessel, comprising a hull of the ocean-going vessel, a cabin water tank, an open annular pipe structure, a ducted dual-magnetic circuit coreless tidal generator, a ducted water transfer pump, a fuel generator set, a control cabinet, a first electric motor, a second electric motor, a first propeller and a second propeller.

The hull is a base of the mobile underwater power generation system, which is weldedly connected with the cabin water tank; and the open annular pipe structure, the ducted dual-magnetic circuit coreless tidal generator, the ducted water transfer pump, the fuel generator set, the control cabinet, the first electric motor, the second electric motor, the first propeller and the second propeller are provided on the hull.

In some embodiments, the cabin water tank is a high-level water storage container corresponding to a depth of a cabin, and is composed of a first vertical steel plate, a bottom steel plate and a second vertical steel plate welded along two sides of the hull and an inner wall of a stern of the ocean-going vessel, and the cabin water tank is configured as a mounting base of the open annular pipe structure.

In some embodiments, the open annular pipe structure is composed of a water inlet pipe and a return pipe connected in series through a bottom pipe elbow and a top pipe elbow, and is provided in the cabin water tank; the ducted dual-magnetic circuit coreless tidal generator is provided in the water inlet pipe; and the ducted water transfer pump is provided in the return pipe.

The ducted dual-magnetic circuit coreless tidal generator is an open underwater power generation device, which is transparent from front to back and is invented based on the existing technology of impact-type through-flow turbines and based on the principle of relativity formulated by Galileo. The ducted dual-magnetic circuit coreless tidal generator is provided in the open annular pipe structure can simultaneously drive an inner rotor water guide blade and an outer rotor water guide blade to rotate relative to each other under the gravitational potential energy of a gravitational acceleration, such that the ducted dual-magnetic circuit coreless tidal generator is driven to cut magnetic field lines of a generator magnetic field, which is equivalent to utilizing the hydraulic potential energy of two times the gravity acceleration, thereby increasing the generating power of the ducted dual-magnetic circuit coreless tidal generator. The ducted dual-magnetic circuit coreless tidal generator refers to a technical solution disclosed by Chinese Patent No. 202021962023.8. The ducted dual-magnetic circuit coreless tidal generator is a key device of this application, which is arranged at a bottom of the water inlet pipe and can utilize the hydraulic potential energy of gravity acceleration generated by the open annular pipe structure, so as to achieve underwater power generation.

The ducted water transfer pump is also one of the main devices of the mobile underwater power generation system, and is arranged at a top of an outlet of the return pipe. The ducted water transfer pump is configured to flow water entering the open annular pipe structure and pump the water into the cabin water tank, thereby replacing the pumping and drainage function of a traditional submersible pump.

The fuel generator set is a professional device in the existing power generation technology. In this application, the fuel generator set is configured to provide electric energy to the ducted water transfer pump, such that a water flow in the open annular pipe structure can flow and generate a hydraulic potential energy of gravity acceleration under an action of gravity of the earth, so as to impact the ducted dual-magnetic circuit coreless tidal generator provided at the bottom of the water inlet pipe. As long as the ducted water transfer pump can continue to operate, the ducted dual-magnetic circuit coreless tidal generator can continue to generate electrical energy. Since the fuel generator set is an existing conventional power generation technology, there is no need to make a technical description in this application.

The control cabinet is an ancillary device for existing conventional power distribution technology. Since the subject of this application is the mobile underwater power generation system, there is no need to make a technical description of the control cabinet in this application.

The first electric motor and the second electric motor are existing conventional devices in transmission technology, and are configured to provide driving energy for the hull. Therefore, there is no need to make a technical explanation of the first electric motor and the second electric motor in this application.

The first propeller and the second propeller refer to an existing propeller propulsion technology for ocean-going vessels, and there is no need to make a technical explanation in this application.

In some embodiments, the ducted water transfer pump further comprises a main shaft, a first fixing ring, an annular housing, a first bearing component, an annular stator winding structure, a rotor permanent magnet, a second bearing component, a second fixing ring, four first fixing components, a flange bolt, a first rotor graphite bearing, an annular mounting sleeve, a water guide blade, a lead wire, a second rotor graphite bearing and four second fixing components.

Specifically, the first rotor graphite bearing is sleevedly provided on the main shaft; the second rotor graphite bearing is sleevedly provided on the main shaft; the annular mounting sleeve is sleevedly provided on an outer wall of the first rotor graphite bearing and an outer wall of the second rotor graphite bearing; an inner end of the water guide blade is arranged on an outer wall of the annular mounting sleeve; the second bearing component is annular, and is provided at an outer end of the water guide blade; the rotor permanent magnet is composed of a plurality of permanent magnet units arranged at an outer wall of the second bearing component in an order from N-pole to S-pole; the first bearing component is arranged on an inner wall of the annular housing; the annular stator winding structure comprises a plurality of stator winding coils, and a polymer resin material filled in the plurality of stator winding coils for insulation and waterproofing, and the annular stator winding structure is arranged on an inner wall of the first bearing component; the annular housing is equivalent to a casing of a traditional water pump motor; the annular housing has a screw hole; and the flange bolt is arranged in the screw hole of the annular housing, and is configured for connection with the return pipe. A first end of each of the four first fixing components is arranged on the first fixing ring, the first fixing ring is sleevedly provided on a first end of the main shaft, and a second end of each of the four first fixing components is arranged on an inner wall of the annular housing to form a first crisscross structure; a first end of each of the four second fixing components is arranged on the second fixing ring, the second fixing ring is sleevedly provided on a second end of the main shaft, and a second end of each of the four second fixing components is arranged on the inner wall of the annular housing to form a second crisscross structure; and the first crisscross structure and the second crisscross structure are equivalent to two closed end covers of a traditional water pump motor.

Specifically, the mobile underwater power generation system is based on a theoretical calculation formula of an existing water pump power consumption: $N=Q \times H/367 \times (0.85)$, wherein N represents a power of a water pump in kW, Q represents a flow in $m^3/h$, H represents a head in m, 367 is a fixed value, and 0.85 is a coefficient of a flow size of the water pump. Comparing with an existing theoretical calculation formula of hydropower: $P=9.81 \times Q \times H \times (0.85)(kW)$, wherein P is a generator power in kW/h, 9.81 is a fixed value of gravity acceleration, Q is a water flow rate in $m^3/h$, H is a falling speed of a water flow in m, and 0.85 is a coefficient of the water flow. It is assumed that an inner diameter of the open annular pipe structure is DN500 mm, a flow meter is 706 $m^3/h$, and a designed flow rate of a drain pump is 3 m/h. According to the water pump calculation formula: 6.78 kW $(706 \times 3) \times 1/367 \times (0.85)$. Under an action of atmospheric pressure and water flow pressure, the water flow will automatically be sucked into the water inlet pipe. A water flow discharged by the ducted water transfer pump is equal to a water flow entering the open annular pipe structure. According to the hydroelectric power generation formula, it can be calculated that 17.66 kW=$9.81 \times (706) \times 3 \times (0.85)$. An effective power generation power of the mobile underwater power generation system is calculated by subtracting a power consumption of drainage from the generator power. In addition, the ducted dual-magnetic circuit coreless tidal generator has a function of absorbing two times the water flow. Therefore, the mobile underwater power generation system can fully achieve an expected effect of generator power greater than the power consumption of the ducted water transfer pump. Therefore, in this application, if there is no ducted water transfer pump and artificial establishment of the assumption of utilizing gravitational potential energy, the open annular pipeline structure will not be configured to utilize the hydraulic potential energy of gravity acceleration, and the ducted dual-magnetic circuit coreless tidal generator will also have no use, let alone the invention of the mobile underwater power generation system, and it will be impossible for moving ocean-going vessels to obtain clean electric energy. In summary, for the above indispensable technical ideas, this technical solution can be fully self-consistent with the natural laws of gravity and the second law of motion through the logical reasoning analysis of Newtonian mechanics.

BRIEF DESCRIPTION OF THE DRAWINGS

In order to explain the technical solutions in the embodiments of the present disclosure or in the prior art more clearly, the accompanying drawings required in the description of the embodiments will be briefly described below. Obviously, presented in the drawings are merely some embodiments of the disclosure. For those of ordinary skill in the art, other drawings can be obtained based on the structures illustrated herein without making creative efforts.

Figure 1:
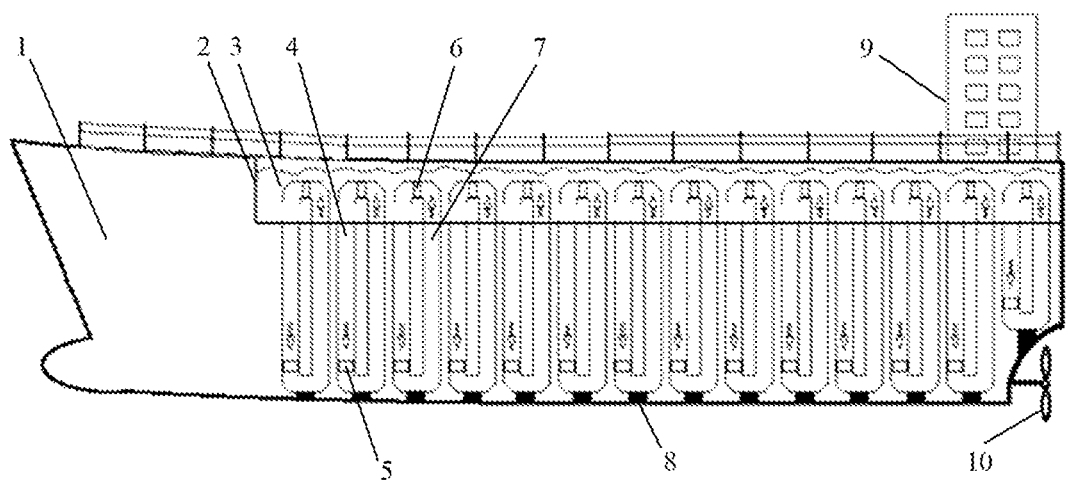
FIG. 1 is a longitudinal sectional view of a mobile underwater power generation system for an ocean-going vessel in accordance with an embodiment of the present disclosure.

In the drawings: 1. hull; 2. cabin water tank; 3. open annular pipe structure; 4. water inlet pipe; 5. ducted dual-magnetic circuit coreless tidal generator; 6. ducted water transfer pump; 7. return pipe; 8. mounting base; 9. cockpit; 10. first propeller; 11. first vertical steel plate; 12. bottom steel plate; 13. fuel generator set; 14. control cabinet; 15. first electric motor; 16. second electric motor; 17. second vertical steel plate; 18. second propeller; 1001. main shaft; 1002. first fixing ring; 1003. annular housing; 1004. first bearing component; 1005. annular stator winding structure; 1006. rotor permanent magnet; 1007. second bearing component; 1008. second fixing ring; 1009. first fixing component; 10010. flange bolt; 10011. first rotor graphite bearing; 10012. annular mounting sleeve; 10013. water guide blade; 10014. lead wire; 10015. second rotor graphite bearing; and 10016. second fixing component.

DETAILED DESCRIPTION OF EMBODIMENTS

A mobile underwater power generation system provided herein for an ocean-going vessel will be described in detail below with reference to the accompanying drawings and the embodiments of the present disclosure. Obviously, described below are some embodiments of the present disclosure, rather than all the embodiments. Based on the embodiments of the present disclosure, all other embodiments obtained by those skilled in the art without making creative efforts shall fall within the scope of the present disclosure.

Figure 2:
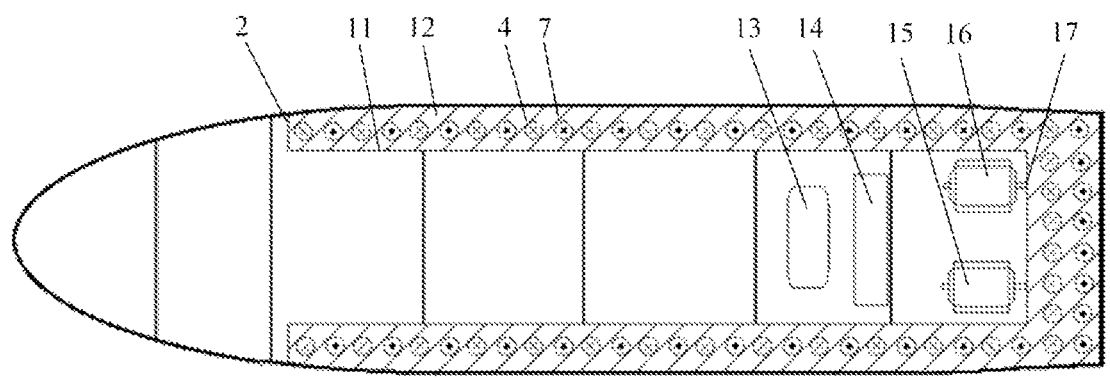
FIG. 2 is a top view of the mobile underwater power generation system in accordance with an embodiment of the present disclosure.
Figure 3:
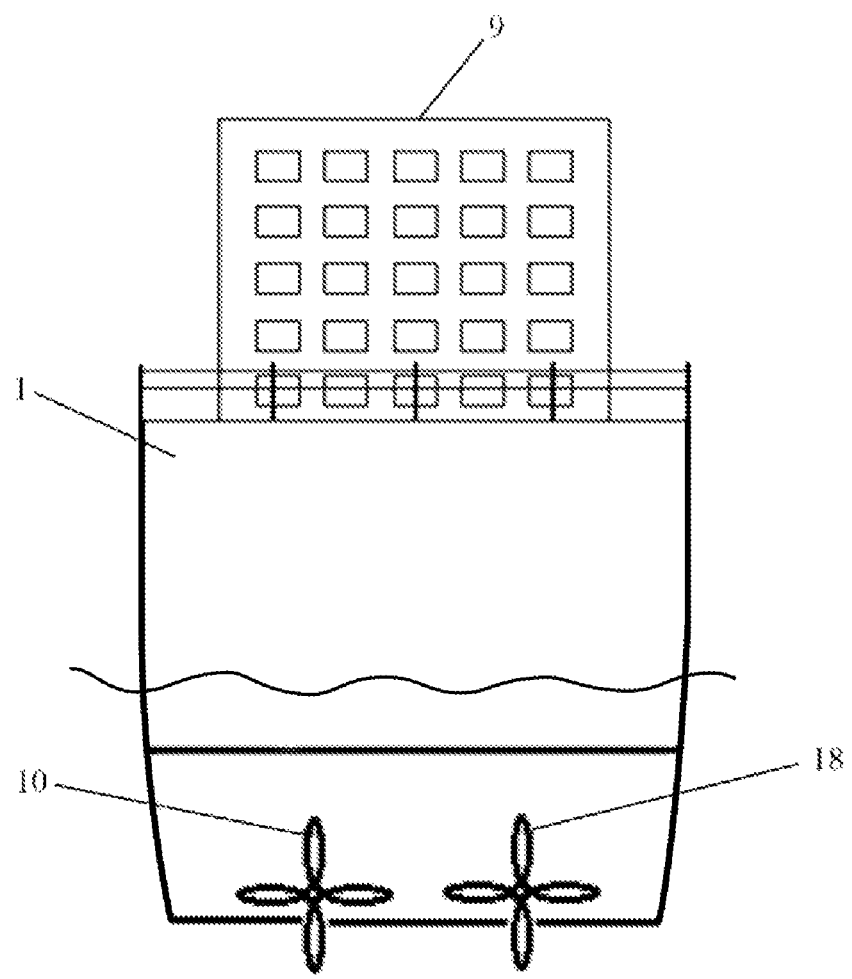
FIG. 3 is a schematic diagram of a stern of the ocean-going vessel in accordance with an embodiment of the present disclosure.

As shown in FIGS. 1-3, a hull 1 of the ocean-going vessel is a main body carrying a cabin water tank 2, an open annular pipe structure 3, a ducted dual-magnetic circuit coreless tidal generator 5, a ducted water transfer pump 6, a fuel generator set 13, a control cabinet 14, a first electric motor 15, a second electric motor 16, a first propeller 10 and a second propeller 18.

As shown in FIGS. 1-2, the cabin water tank 2 is a high-level water storage container corresponding to a depth of a cabin, and is composed of a first vertical steel plate 11, a bottom steel plate 12 and a second vertical steel plate 17 welded along two sides of the hull and an inner wall of a stern of the ocean-going vessel. The cabin water tank 2 is configured as a mounting base of the open annular pipe structure 3.

As shown in FIGS. 1-2, the open annular pipe structure 3 is composed of a water inlet pipe 4 and a return pipe 7 connected in series through a bottom pipe elbow and a top pipe elbow, and is provided in the cabin water tank 2. The ducted dual-magnetic circuit coreless tidal generator 5 is provided in the water inlet pipe 4. The ducted water transfer pump 6 is provided in the return pipe 7.

As shown in FIG. 3, the first propeller 10 is arranged on a first side of the hull 1, and the second propeller 18 is arranged on a second side of the hull 1, indicating that the ocean-going vessel can use the first electric motor 15 and the second electric motor 16 to change rotation speeds and directions of the first propeller 10 and the second propeller 18, thereby changing a driving direction of the ocean-going vessel. In this embodiment, only the first propeller 10 and the second propeller 18 are designed to replace a stern rudder of the ocean-going vessel. Therefore, those skilled in the art can mount four or more propellers according to a displacement tonnage of an ocean-going vessel.

Figure 4:
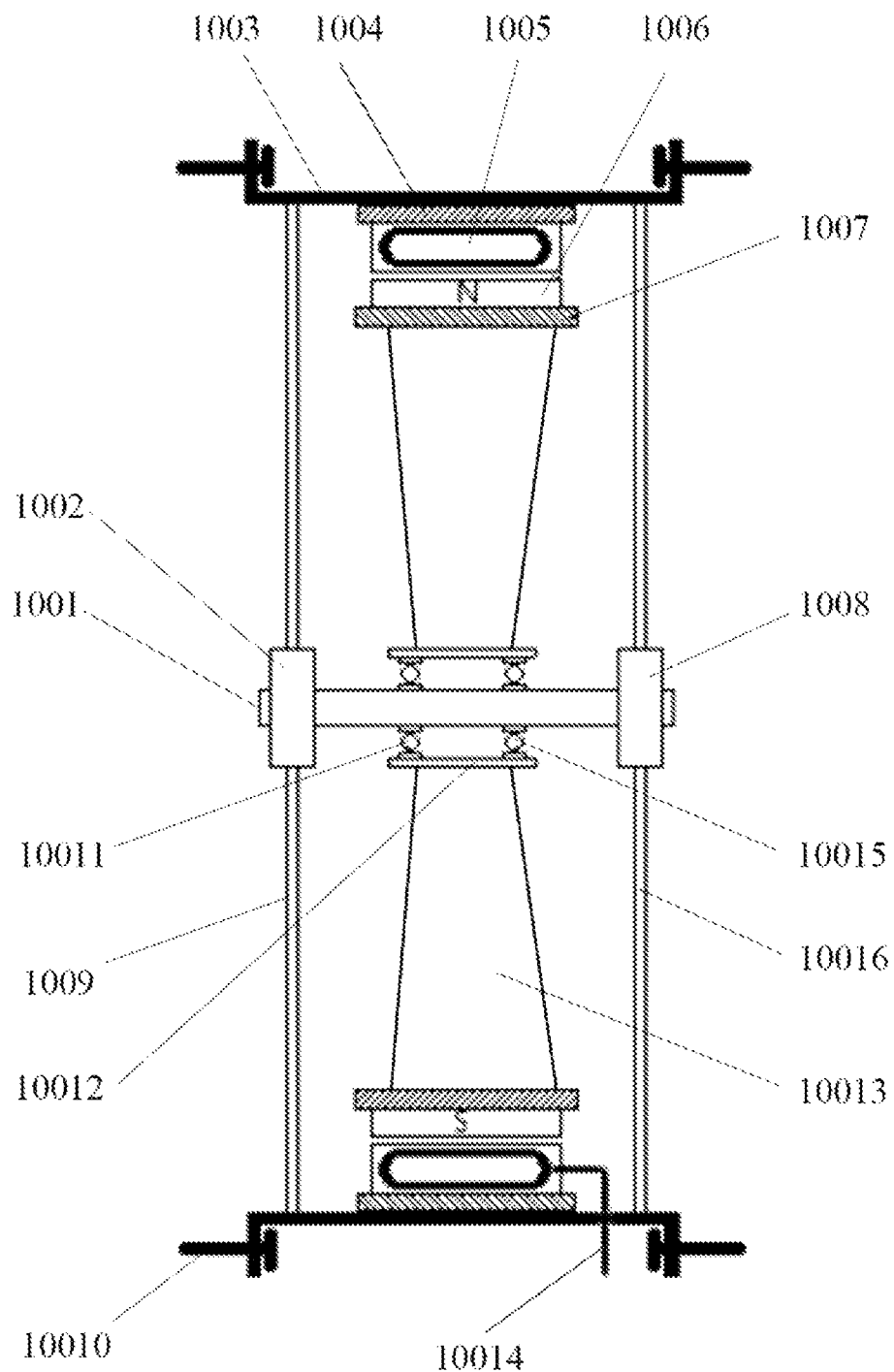
FIG. 4 is a side sectional view of a ducted water transfer pump of the mobile underwater power generation system in accordance with an embodiment of the present disclosure.
Figure 5:
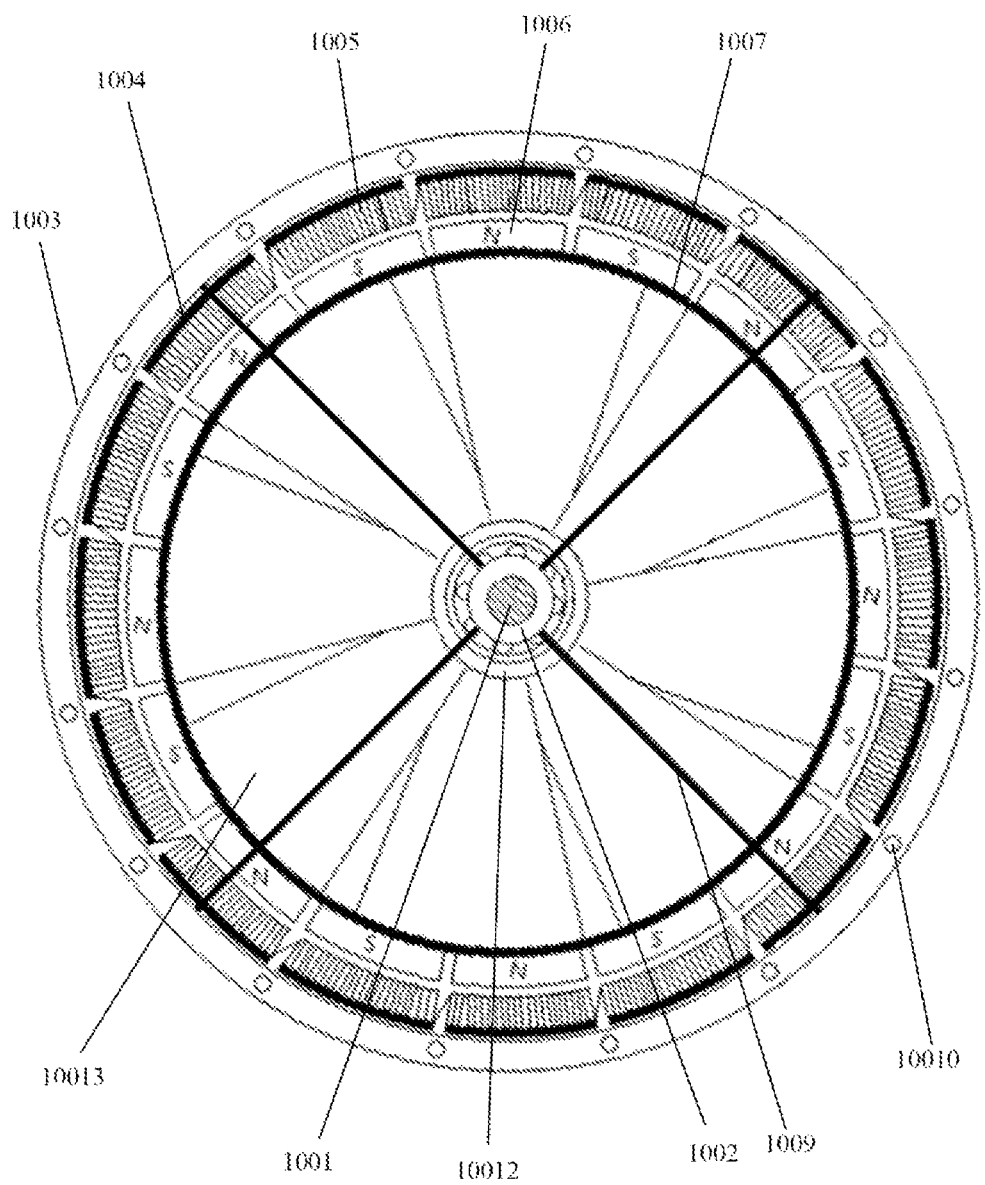
FIG. 5 is a top view of the ducted water transfer pump in accordance with an embodiment of the present disclosure.

As shown in FIGS. 4-5, a first rotor graphite bearing 10011 is sleevedly provided on a main shaft 1001, and a second rotor graphite bearing 10015 is sleevedly provided on the main shaft 1001. An annular mounting sleeve 10012 is sleevedly provided on an outer wall of the first rotor graphite bearing 10011 and an outer wall of the second rotor graphite bearing 10015. An inner end of a water guide blade 10013 is arranged on an outer wall of the annular mounting sleeve 10012. A second bearing component 1007 is annular, and is provided at an outer end of the water guide blade 10013. A rotor permanent magnet 1006 is composed of a plurality of permanent magnet units arranged at an outer wall of the second bearing component 1007 in an order from N-pole to S-pole. A first bearing component 1004 is arranged on an inner wall of an annular housing 1003. An annular stator winding structure 1005 comprises a plurality of stator winding coils and a polymer resin material filled in the plurality of stator winding coils for insulation and water-proofing, and the annular stator winding structure is arranged on an inner wall of the first bearing component 1004. The annular housing 1003 is equivalent to a casing of a traditional water pump motor. The annular housing 1003 has a screw hole, and a flange bolt 10010 is arranged in the screw hole of the annular housing 1003, and is configured for connection with the return pipe 7.

As shown in FIGS. 4-5, a first end of each of four first fixing components 1009 is arranged on a first fixing ring 1002, the first fixing ring 1002 is sleevedly provided on a first end of the main shaft 1001, and a second end of each of the four first fixing components 1009 is arranged on an inner wall of the annular housing 1003 to form a first crisscross structure. A first end of each of four second fixing components 10016 is arranged on a second fixing ring 1008, the second fixing ring 1008 is sleevedly provided on a second end of the main shaft 1001, and a second end of each of the four second fixing components 10016 is arranged on the inner wall of the annular housing 1003 to form a second crisscross structure. The first crisscross structure and the second crisscross structure are equivalent to two closed end covers of a traditional water pump motor. The ducted water transfer pump 6 is configured to be in an open through design such that a water flow passing through the open annular pipe structure 3 can be pumped into the cabin water tank 2 through the first crisscross structure and the second crisscross structure.

Figure 6:
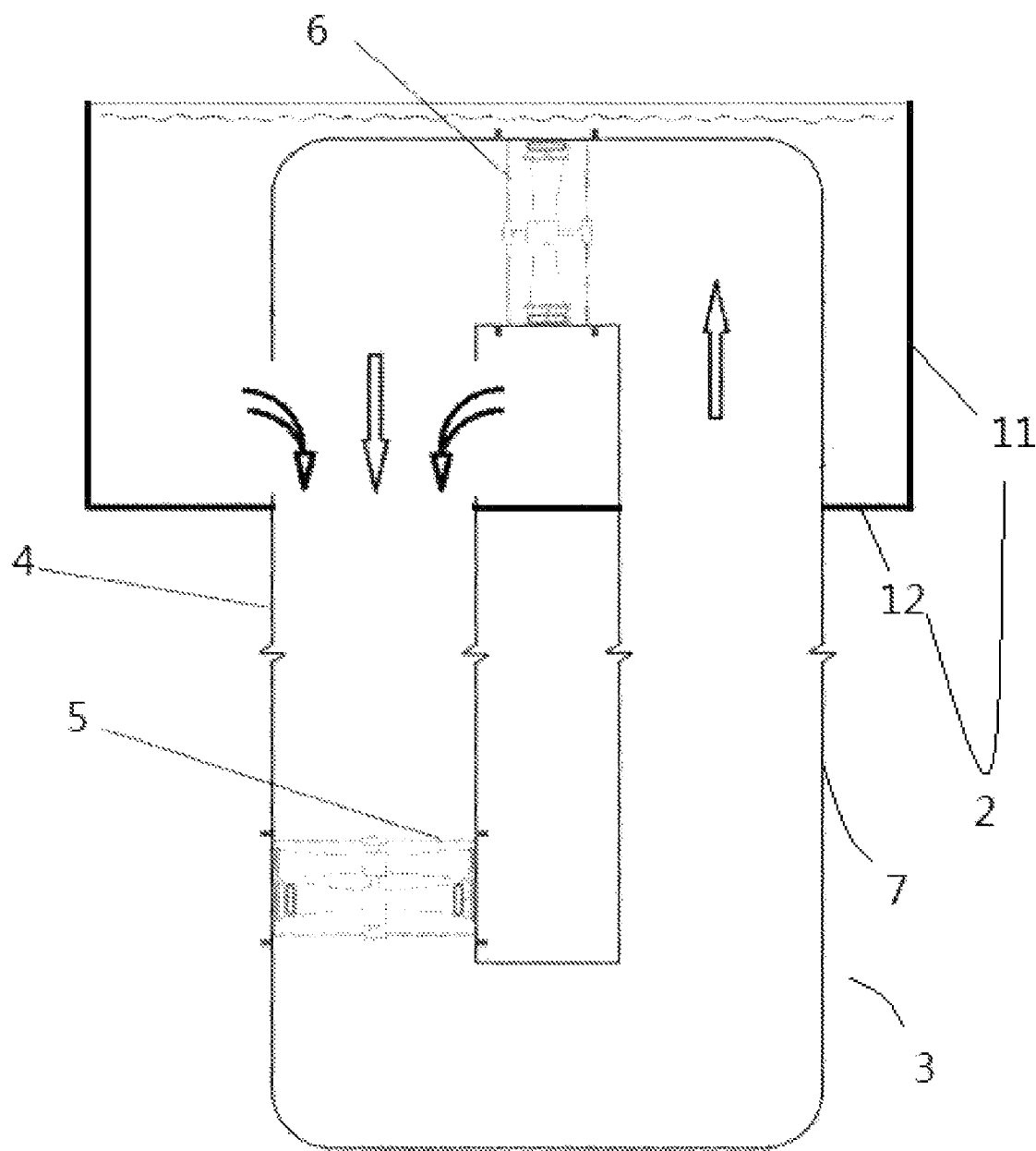
FIG. 6 is a partial enlarged view of an open annular pipe structure of the mobile underwater power generation system in accordance with an embodiment of the present disclosure.

As shown in FIG. 6, if the open annular pipe structure 3 is made into a closed circulation pipe structure, a water flow from the cabin water tank 2 will not automatically enter an inlet of the water inlet pipe 4, and it will not be possible to generate a hydraulic potential energy accelerated by gravity. The ducted water transfer pump 6 arranged in the open annular pipe structure 3 will increase the power consumption due to pipeline head resistance. The ducted dual-magnetic circuit coreless tidal generator 5 arranged in the water inlet pipe 4 will also face the question that "energy will neither be generated nor disappear out of thin air". However, since the open annular pipe structure 3 is vertically arranged in the cabin water tank 2, the water inlet pipe 4 and the return pipe 7 are completely submerged in the cabin water tank 2. Even without the pumping and drainage function of the ducted water transfer pump 6, a water level in the return pipe 7 will be equal to a water level in the cabin water tank 2. Since the ducted water transfer pump 6 is arranged at an outlet of the return pipe 7 without the power consumption due to head resistance, the ducted water transfer pump 6 can use a least amount of electric energy to pump a water flow from the open annular pipe structure 3 into the cabin water tank 2, so as to form a negative pressure state at an inlet of the water inlet pipe 4. A water flow in a saturated state at the inlet of the water inlet pipe 4 will automatically flow into the water inlet pipe 4 to form the hydraulic potential energy accelerated by gravity, such that the water flow is forced from top to bottom along the water inlet pipe 4 to impact the ducted dual-magnetic circuit coreless tidal generator 5 provided at the bottom of the water inlet pipe 4 to continuously generate generating current. The water flow passing through the ducted dual-magnetic circuit coreless tidal generator 5 can continue to return to the ducted water transfer pump 6 along the return pipe 7 from bottom to top under an inertia push of gravity acceleration. As long as the ducted water transfer pump 6 can operate continuously, the circulating hydraulic potential energy accelerated by gravity will surely become an inexhaustible clean energy source for the mobile underwater power generation system for the ocean-going vessel.

Obviously, the embodiments described in the present disclosure are only examples to clearly illustrate the present disclosure, and are not intended to limit the implementation of the present disclosure. Other variations or modifications can be made on the basis of the above description. It is not possible to exhaustively list all embodiments herein. All other embodiments obtained by those skilled in the art without making creative efforts shall fall within the scope of the present disclosure defined by the appended claims.

In the description of this application, relational terms such as "first" and "second" are only descriptive, and cannot be understood as indicating or implying relative importance or implicitly indicating the number of indicated technical features. Therefore, features defined as "first" and "second" can explicitly or implicitly include at least one of the features. In the description of this application, "a plurality of" means at least two, such as two, three, etc., unless otherwise expressly and specifically limited.

What is claimed is:

1. A mobile underwater power generation system for an ocean-going vessel, comprising:
    a hull of the ocean-going vessel;
    wherein the hull is weldedly connected with a cabin water tank; and an open annular pipe structure, a cockpit, a first propeller, a fuel generator set, a control cabinet, a first electric motor, a second electric motor and a second propeller are provided on the hull; and
    the cabin water tank is a water storage container corresponding to a depth of a cabin, and is composed of a first vertical steel plate, a bottom steel plate and a second vertical steel plate welded along two sides of the hull and an inner wall of a stern of the ocean-going vessel, and the cabin water tank is configured as a mounting base of the open annular pipe structure.

2. The mobile underwater power generation system of claim 1, wherein the open annular pipe structure is composed of a water inlet pipe and a return pipe connected in series through a bottom pipe elbow and a top pipe elbow, and is provided in the cabin water tank; a ducted dual-magnetic circuit coreless tidal generator is provided in the water inlet pipe; and a ducted water transfer pump is provided in the return pipe.

3. The mobile underwater power generation system of claim 2, wherein the ducted water transfer pump comprises a main shaft, an annular housing, a first bearing component, an annular stator winding structure, a rotor permanent magnet, a second bearing component, a flange bolt, a first rotor graphite bearing, an annular mounting sleeve, a water guide blade and a second rotor graphite bearing;
    the first rotor graphite bearing is sleevedly provided on the main shaft; the second rotor graphite bearing is sleevedly provided on the main shaft; the annular mounting sleeve is sleevedly provided on an outer wall of the first rotor graphite bearing and an outer wall of the second rotor graphite bearing; an inner end of the water guide blade is arranged on an outer wall of the annular mounting sleeve; the second bearing component is annular, and is provided at an outer end of the water guide blade; the rotor permanent magnet is composed of a plurality of permanent magnet units arranged at an outer wall of the second bearing component in an order from N-pole to S-pole; and the first bearing component is arranged on an inner wall of the annular housing; and
    the annular stator winding structure comprises a plurality of stator winding coils and a polymer resin material filled in the plurality of stator winding coils for insulation and waterproofing, and the annular stator winding structure is arranged on an inner wall of the first bearing component; the annular housing has a screw hole; and the flange bolt is arranged in the screw hole of the annular housing, and is configured for connection with the return pipe.

4. The mobile underwater power generation system of claim 2, wherein the ducted water transfer pump comprises a main shaft, a first fixing ring, an annular housing, a second fixing ring, four first fixing components and four second fixing components;
    a first end of each of the four first fixing components is arranged on the first fixing ring, the first fixing ring is sleevedly provided on a first end of the main shaft, and a second end of each of the four first fixing components is arranged on an inner wall of the annular housing to form a first crisscross structure; a first end of each of the four second fixing components is arranged on the second fixing ring, the second fixing ring is sleevedly provided on a second end of the main shaft, and a second end of each of the four second fixing components is arranged on the inner wall of the annular housing to form a second crisscross structure; and the ducted water transfer pump is configured to be in an open through design such that a water flow passing through the open annular pipe structure is pumped to the cabin water tank through the first crisscross structure and the second crisscross structure.

* * * * *